000
United States Patent [19]

Fuchs

[11] 4,325,354
[45] Apr. 20, 1982

[54] ENERGY CONVERSION APPARATUS

[76] Inventor: Francis J. Fuchs, 9 University Way, Princeton, N.J. 08550

[21] Appl. No.: 5,003

[22] Filed: Jan. 22, 1979

[51] Int. Cl.³ .............................................. F22B 37/10
[52] U.S. Cl. .................................... 126/247; 122/26; 415/18
[58] Field of Search ......................... 122/26; 126/247; 415/18, 2, 13; 60/641; 290/44, 55

[56] References Cited

U.S. PATENT DOCUMENTS

| 43,049 | 6/1864 | Trim | 415/18 X |
| 1,142,538 | 6/1915 | Snee et al. | 290/44 X |
| 1,650,612 | 11/1927 | Denniston | 122/26 |
| 3,952,723 | 4/1976 | Browning | 60/641 X |
| 4,115,027 | 9/1978 | Thomas | 415/2 R |

FOREIGN PATENT DOCUMENTS 1010841  5/1977  Canada ................................. 126/247

*Primary Examiner*—Allen M. Ostrager
*Assistant Examiner*—Stephen F. Husar
*Attorney, Agent, or Firm*—Carella, Bain, Gilfillan & Rhodes

[57] ABSTRACT

An apparatus for maintaining the speed of rotation of a windmill rotor at a fixed ratio to the free flow velocity of the driving wind. This arrangement permits the windmill rotor to rotate at the speed at which its power output is maximized. The apparatus includes a plurality of interleaved rotating and stationary friction discs which convert the rotational kinetic energy of the windmill rotor shaft into thermal energy. An anemometer shaft, which rotates with a velocity which is proportional to the ambient wind velocity, drives a gear train which increases or decreases the pressure on the friction discs so that the load on the rotor is increased or decreased, in an offsetting manner, as the wind velocity changes.

6 Claims, 6 Drawing Figures

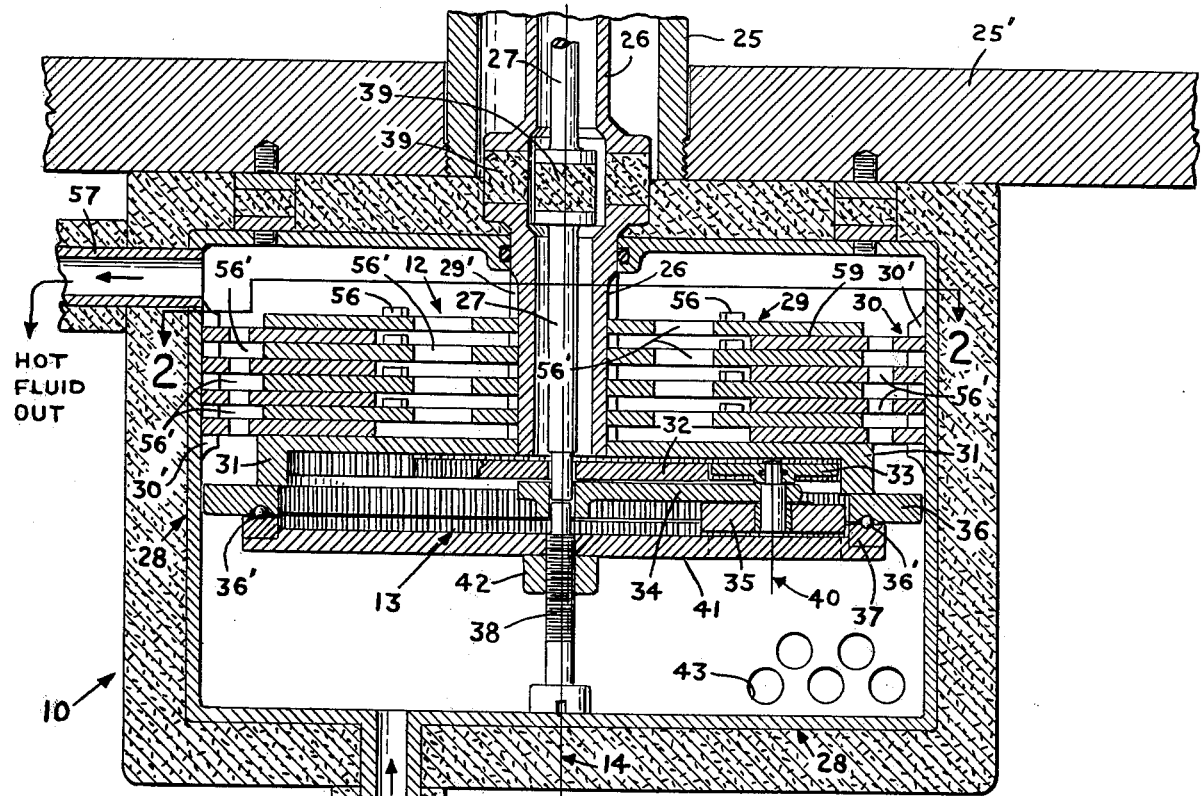
FIG. 1
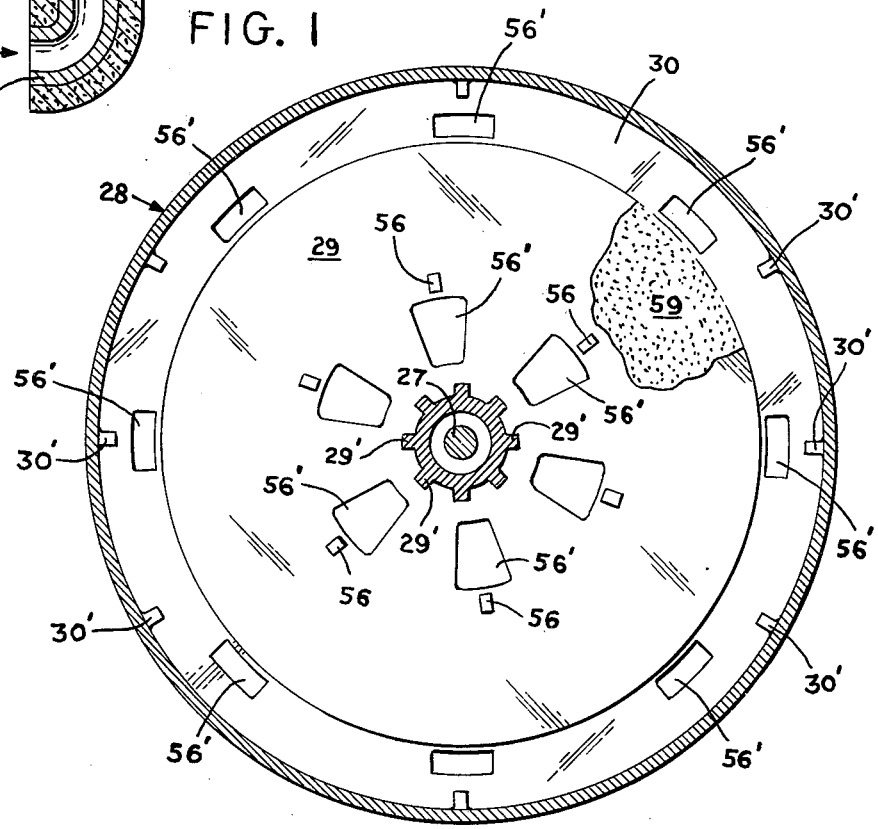

ENERGY CONVERSION APPARATUS

BACKGROUND OF THE INVENTION

1. Field of the Invention

Broadly speaking, this invention relates to energy conversion. More particularly, this invention relates to methods and apparatus for converting rotational kinetic energy into thermal energy.

2. Description of the Prior Art

The prior art approach most often utilized for the conversion of the kinetic energy contained in a moving stream of fluid involves the use of turbines, windmills and the like. Such prior art apparatus will hereinafter be referred to generically as a windmill, whether or not air is the ambient flowing fluid used.

Prior art windmills typically comprise a rotor which is rotated by the impinging wind and a shaft secured to the rotor to couple the rotational energy of the rotor to some suitable output device. As is well known, such rotational energy may be used, for example, to drive a generator for the production of electricity, to pump water for irrigation purposes, etc., etc., Prior art windmills are generally either horizontal or vertical windmills having rotors for rotation about horizontal and vertical axes, respectively. More specifically, horizontal windmills have their axes oriented parallel to the direction of the wind while vertical windmills have their axes oriented normal to the wind. This difference in orientation produces some characteristic differences between horizontal and vertical windmills which should be discussed.

First, to achieve maximum efficiency, horizontal windmills must be provided with some suitable means for continually maintaining the rotor axis parallel to the direction of the wind. Vertical windmills, on the other hand, are omni-directional and, thus, do not need to be continually repositioned.

Furthermore, horizontal windmills are provided with rotor blades that rotate in a perpendicular plane. At some wind velocities the speed of the windmill rotation is considerably greater than the velocity of the wind. In order to keep destructive centrifugal forces to a minimum at such high wind velocities, horizontal windmill rotor blades are usually "feathered," with a resultant decrease in their power output. It is thus necessary to sacrifice power output in order to maintain the integrity of a horizontal windmill at high wind velocities. Vertical windmills, on the other hand, do not usually need to be feathered to prevent destruction since they do not rotate at speeds which are greater than the velocity of the wind. Concern for the integrity of prior art vertical windmills generally arises only at *extremely* high wind velocities, velocities which are well beyond those magnitudes necessitating feathering of horizontal windmills.

Furthermore, prior art horizontal windmills have an inherently high inertia and do not generally begin to rotate and generate power until the wind velocity is at a relatively high magnitude. Vertical windmills, on the other hand, tend to have a lower inertia and are, thus, capable of beginning to rotate and generating power at lower wind velocities.

In view of the above, it is generally recognized by those skilled in the art that vertical windmills possess characteristics which make them considerably more attractive than horizontal windmills for efficient conversion of the kinetic energy contained in the wind. Furthermore, it is known that the power output of a vertical windmill is, in part, a function of its rotational speed. It is also known that this relationship is not linear but, rather, the energy output will be at a maximum at a certain predetermined rotational speed, that speed being a function of the design of the particular vertical windmill. For example, a Darrieus-type windmill rotor has a maximum power output when the ratio of the blade tip speed to the free-flow wind velocity is approximately six, while a Savonius-type rotor has a maximum energy power output at a ratio of approximately 1.

While it is generally recognized then that the energy output of a vertical windmill is maximized at a certain relative rotational speed, there is no known prior art device which will maintain this power output at a maximum level.

SUMMARY OF THE INVENTION

Accordingly, it is an object of this invention to provide an apparatus for enhancing the power output of a vertical windmill by maintaining such output at a maximum level.

The above and other objects are achieved by an apparatus which includes a speed governing mechanism for regulating the rotational speed of a vertical windmill rotor to insure continuous maximum power output over a large range of ambient fluid flow velocities. In addition to its regulating function, the present invention also permits operation of vertical windmills in environments having extremely high ambient velocities without being destroyed or having to be "feathered."

In one illustrative embodiment of the invention, the ambient free-flow wind velocity is determined by a rotating anemometer mounted coaxially with a vertical windmill rotor. This enables a comparison of the rotational speed of the anemometer to the rotational speed of the windmill rotor and any speed differential is utilized to vary the load on the vertical windmill, thus, controlling or regulating the rotational speed of the rotor. In addition to the regulating function, the load simultaneously performs an energy conversion whereby the rotational kinetic energy of the windmill rotor is transformed into heat.

A more complete understanding of the present invention may be had from the following detailed description, particularly when read in the light of the accompanying drawings, wherein:

BRIEF DESCRIPTION OF THE DRAWINGS

FIG. 1 is a cross-sectional view of a first illustrative embodiment of the invention;

FIG. 2 is a plan view of the apparatus shown in FIG. 1 taken along line 2—2 and depicts the mechanical friction discs shown in FIG. 1 in greater detail;

DETAILED DESCRIPTION OF THE INVENTION

Figure 3:
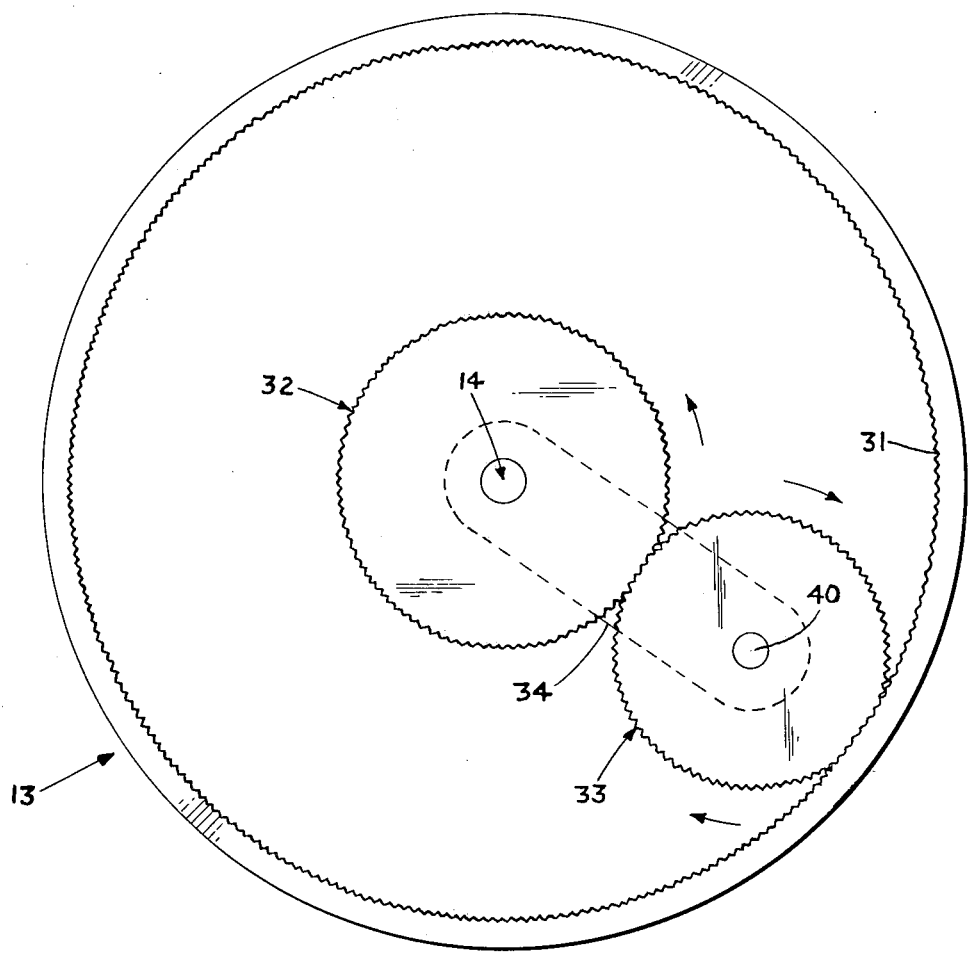
FIG. 3 is a plan view of a portion of the speed control assembly shown in FIG. 1.

FIG. 1 depicts a preferred embodiment the invention designated generally by the numeral 10. As previously discussed, energy converter 10 is designed for use with the rotor of a vertical windmill, or any other rotating member, the rotational speed of which must be constrained in order to maximize power output.

Referring again to FIG. 1, the rotational energy of the vertical windmill (not shown) is transmitted to converter 10 by means of a hollow shaft 26. Converter 10 includes a load device 12 and a speed governor 13 located within a housing 28 and coupled to shaft 26. Shaft 26 is advantageously coaxial with the axis of rotation 14 of the windmill and mounted within the stationary hollow support mast 25 of the windmill. A second rotating shaft 27 is mounted coaxial to the central axis 14 and within shaft 26. The outside diameter of shaft 27 is less than the inside diameter of shaft 26 so that relative rotational motion therebetween is permitted. Shaft 27 is provided for communicating wind velocity information to governor 13 from an anemometer or other instrumentation package mounted at the top of mast 25 (not shown), as will be described below.

For use with a vertical windmill, mast 25 is positioned substantially vertically with its lower end affixed to some suitable mast support 25'. For example, the mast may be attached to support 25' by means of a trunion mount (not shown) to permit the mast to be rotated to a horizontal position. This will give access to the windmill and anemometer mounted thereon for adjustment and maintenance. Housing 28, which is generally cylindrical in shape, is surrounded on all exposed surfaces by some suitable thermal insulation 28' and depends from mast support 25', coaxial with the central axis 14. As shown, windmill shaft 26 and anemometer shaft 27 both extend into housing 28; however, to facilitate assembly and reduce thermal losses both of these shafts are advantageously constructed in at least two sections and respectively joined by shaft couplings 39' and 39' constructed of some suitable insulating material, for example, fiberglass.

The lower end of shaft 26 is affixed to a first circular gear 31 while the lower end of shaft 27 is similarly affixed to a second circular gear 32. Both gears 31 and 32 are coaxial with the central axis 14, as best seen in FIG. 3, which shows a plan view of speed governor 13. It will be noted that gears 31 and 32 rotate relative to each other and to housing 28. In the preferred embodiment of this invention, the diameter of gear 31 is three times the diameter of gear 32, and the governor further includes a circular idler gear 33 interposed between gears 31 and 32. Idler gear 33 is rotatably mounted, about an axis 40, at one end of an idler arm 34, the other end of which is rotatably mounted about central axis 14, independently of either shaft 26 or 27.

It will be apparent that the direction of rotation of the shaft 27 and gear 32 must be opposite to that of the shaft 26 and gear 31 if only one idler gear 33 is utilized. Additional idler gears may, however, readily be interposed between gears 31 and 32 if it is desired to change the directions of relative rotation of the anemometer and windmill shafts.

In the above-described embodiment, the effect of idler gear 33 will be to hold idler arm 34 motionless when the speed of rotation of the windmill is one-third that of the anemometer. Obviously, by the use of different gearing idler arm 34 may be held motionless at some other speed ratio. In any event, any departure from the predetermined speed ratio will cause idler arm 34 to rotate about axis 14 in either a clockwise or counterclockwise direction, depending upon whether the windmill is rotating slower or faster than the anemometer. As will be described below, the rotation of idler arm 34 is utilized to vary the load on the windmill and thereby control the rotational speed of the windmill.

Those skilled in the art will realize that it is undesirable to have more than a very slight load on an anemometer in order not to affect the ability to accurately monitor the prevailing wind velocity. Consequently, a further gear reduction is advantageously utilized to transform idler arm 34 into a useful mechanism for regulating the rotor speed of an actual windmill. This further gear reduction is accomplished by means of a planetary gear arrangement, best seen in FIG. 1, driven by a third circular gear 35 rotatably mounted at the end of idler arm 34, coaxial with axis 40 of idler gear 33. While FIG. 1 shows gear 35 on the side of idler arm 34 which is opposite to gear 33 such positioning is not essential. Also, the diameter of gear 35 is not critical so long as it is in engagement with two additional circular gears 36 and 37, each of which are positioned coaxially with central axis 14 and separated one from the other by a plurality of ball bearings 36'. Gear 36 is in contact with the top surface of gear 37 and is splined to housing 28 by means not shown, and is therefore constrained to move only longitudinally relative to axis 14. Gear 37 is, however, free to rotate about central axis 14. In the preferred embodiment of the invention, there is at least a one-tooth difference between gears 36 and 37; consequently, for each revolution of idler arm 34 about axis 14, there will be a rotation of gear 37 about axis 14 which is equivalent to the arcuate distance between two adjacent teeth on gear 37. Different gear reductions may be provided, in accordance with the invention, by merely utilizing gears having different numbers of teeth.

Gear 37 is secured by connecting means 41, for example a spoke (not shown), to a threaded nut 42 which engages a threaded stud 38 which is non-rotatably mounted to housing 28, coaxial with central axis 14. Thus, as gear 37 rotates about axis 14, its rotational motion is translated into vertical motion of nut 42.

This vertical motion of nut 42 is, in turn, utilized to regulate the load on the windmill and thereby regulate its speed. In one embodiment of the invention, both of the functions accomplished by the vertical motion of nut 42, e.g. the load regulation and speed regulation, are accomplished simultaneously by load mechanism 12.

As best seen in FIGS. 1 and 2, load mechanism 12 includes a plurality of rotating friction discs 29 and a corresponding plurality of interleaved, stationary friction discs 30. Friction discs 29 are secured via splines 29' to shaft 26 and rotate therewith. Stationary friction discs 30, on the other hand, are structured as annular rings secured to housing 28 via splines 30' and are accordingly constrained to move only longitudinally, parallel to axis 14. As previously mentioned, friction discs 29 and 30 are interleaved, as best seen in FIG. 1, and the lowermost disc 30 is in slidable engagement with gear 31 which rotates with shaft 26. The annular portion of gear 31 forming the interface between gear 31 and the lowermost disc 30 may be provided with a friction-producing material similar to that provided on discs 29 and 30. It will be apparent that relative motion between discs 29 and 30 will produce frictional heat. Thus, the kinetic energy of the wind which is converted into rotational kinetic energy by a windmill rotor will be converted into heat.

FIG. 2 shows a partially cut-away plan view of the apparatus shown in FIG. 1, taken along line 2—2. FIG.

2 thus shows a disc 29 and a disc 30 overlapping along an interfacing surface 59. Those skilled in the art will understand that the extent of the overlap between any two adjacent discs 29 and 30 may be varied as a function of the type of friction material employed in the discs and as a function of the circulation enhancing projections 56 and apertures 56' to be discussed below.

Returning now to FIG. 1, the load regulation function and the speed regulation function of load mechanism 12 may be described as follows:

As gear 37 rotates in response to the rotation of idler arm 34, it will be urged longitudinally up or down along axis 14. This motion, in turn, urges gear 36 up or down and, thus, similarly urges gear 31 up or down, whereby the compression forces generated between friction discs 29 and 30 are increased or decreased, respectively. These compression forces are further enhanced by preventing upward vertical motion of friction discs 29 and 30 along their respective splines beyond a predetermined point so that the upwardly urging action of gear 37 will squeeze the various friction discs together.

Increasing compression forces produce increased friction which, naturally, generates increased heat and an increased load on the windmill rotor. An increased load will, in turn, cause the windmill rotor to decrease its rotational velocity which, in turn, causes gear 31 to decrease its rotational velocity. As a result, gears 31 and 32 will reach equilibrium and idler arm 34 will cease rotation. This, in turn, will cause gear 37 to cease exerting any net vertical force on gear 36 and the compression forces will thus stabilize. If the windmill slows excessively, however, idler arm 34 will begin rotating in the opposite direction and nut 42 will cause the compression forces to decrease so as to enable the windmill rotor to speed up, thus permitting gears 31 and 32 to again reach equilibrium and stop the rotation of idler arm 34.

The heat which is generated by the friction between the discs 29 and 30 may be circulated through housing 28 via cold inlet pipe 58 and hot outlet pipe 57, by means of an external circulating pump (not shown). The circulation of the fluid, and hence the heat transfer between it and the friction discs is enhanced by providing a plurality of projections 56 on the discs 29 and a corresponding plurality of apertures 56' within both discs 29 and 30. The projections 56 enhance fluid circulation by moving the fluid heat transfer oil while the apertures 56' enhance fluid circulation by enabling the heat transfer oil to flow in intimate contact with the heat-generating interfaces between discs 29 and 30. This heat transfer oil may be transferred to a desired point of use external to housing 28 or, alternatively, heat exchanger coils 43, shown partially in diagrammatic cross-section in FIG. 1, may be utilized to circulate a second fluid through the fluid in housing 28. For example, water for a hot water system may be circulated through coils 43 within housing 28 to directly absorb heat from the heated fluid in housing 28.

Since all the gears and bearings comprising the speed governor 13 are also immersed in the fluid in housing 28, any frictional heat losses generated by these elements are also transferred to the fluid, in addition to the heat generated by and between the friction discs 29 and 30. Thus, the power train, defined as all the elements which are utilized to convert the rotational kinetic energy of the windmill into heat, is highly efficient and the conversion of windmill shaft power into heat is maximized.

Figure 4:
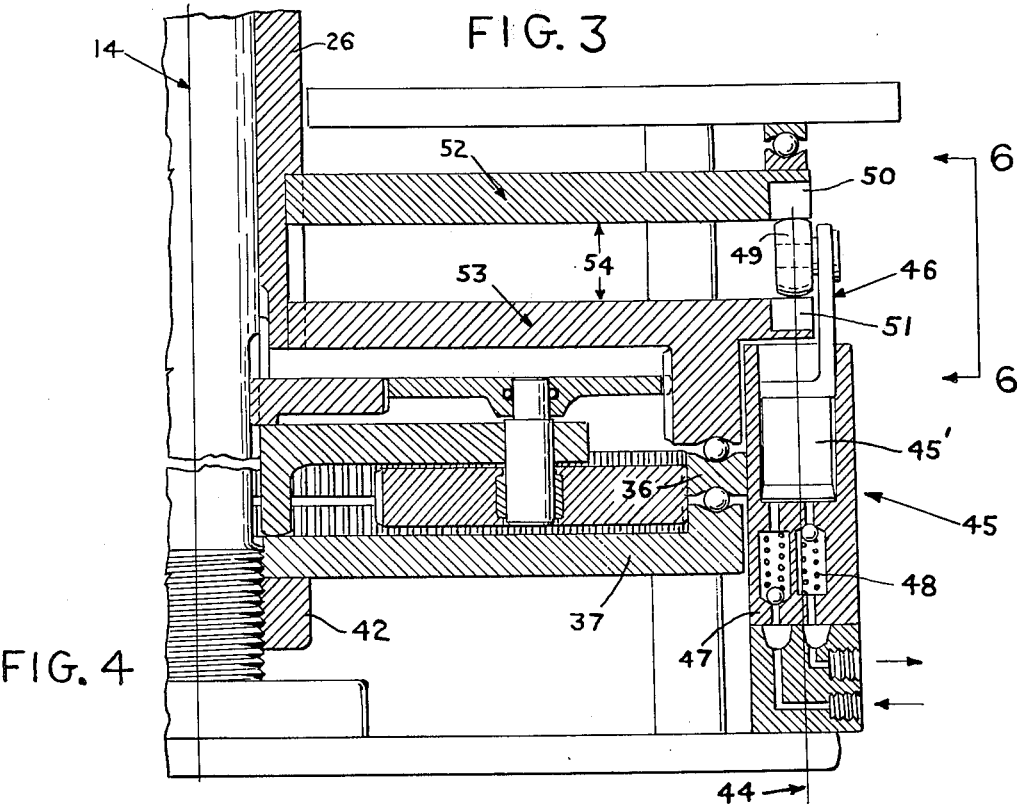
FIG. 4 is a partial cross-sectional view of an alternative embodiment of the invention.
Figure 5:
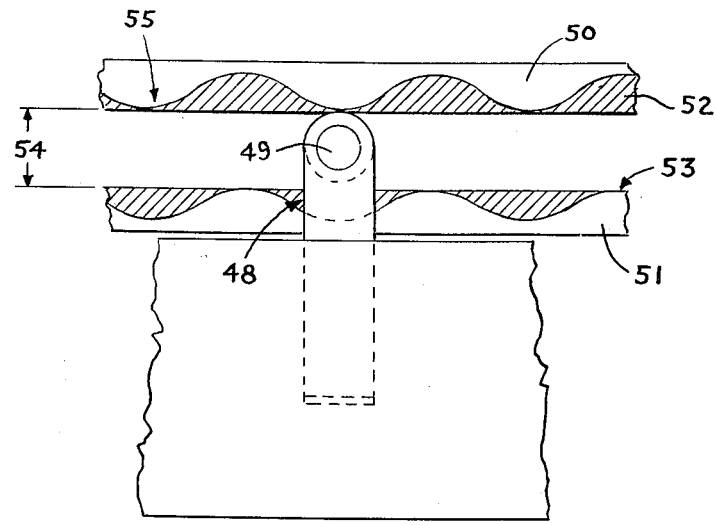
FIG. 5 is a side view of a portion of FIG. 4 and depicts the cam and cam-follower therein in greater detail.

The functions of energy conversion and load feedback inherent in this invention may be achieved by several alternative embodiments. As depicted in FIGS. 4 and 5 the above-discussed speed governor 13 and a variable flow pump 45 constitute one such alternative preferred embodiment. In this embodiment, wind energy inherent in a rotating windmill rotor is converted to useful energy and performs useful work through the utilization of variable flow pump 45 to pump water, or some other suitable fluid, at a variable rate. Pump 45 also constitutes a variable load source which, in the embodiment shown in FIG. 4, may be utilized to regulate the rotational speed of the windmill rotor, as required. Pump 45 thus replaces the friction discs 29 and 30 as the means for producing a load on windmill shaft 26.

The pumping action of pump 45 is achieved by a plurality of vertically reciprocating pistons 45' that are located in numerous cylinders 47, the axes of which are arranged circumferentially around housing 28 parallel to central axis 14 and radially outward of gears 36 and 37. (Note that the gears shown in FIG. 4 differ slightly from those shown in FIG. 1, although the function is essentially the same). Each piston 45' has an upwardly extending portion 46 which passes through the top of the corresponding cylinder 47. Rotatable cam followers 49 are mounted on the distal end of each upwardly extending portion 46 and cause the pistons 45' to take on a vertically reciprocating motion by following upper and lower cam surfaces 50 and 51 respectively, as these cam surfaces are rotated, as will be described below. Cam surfaces 50 and 51 are located on the lower and upper surfaces of upper and lower cylindrical plates 52 and 53 respectively.

Upper and lower plates 52 and 53 are concentrically splined to shaft 26 for rotation therewith. However, upper plate 52 is further affixed to shaft 26 so as to be immovable in a direction parallel to axis 14, in accordance with previously described vertical forces generated by movable gear 37 via threaded nut 42. Thus, as best seen in FIG. 5 the distance between the upper and lower plates 52 and 53 is a function of the rotation of idler arm 34 and the consequent rotation of gear 37. In other words, the distance 54 is a function of the difference between the anemometer shaft velocity and the windmill shaft velocity.

Obviously, when the stroke of pistons 45' is at a maximum, the pistons will be pumping the maximum volume of water through check valves 48. Such a maximum stroke may be smoothly effectuated by causing the pistons to be sinusoidally reciprocated. Thus, it will be noticed that if the upper and lower plates 52 and 53 are separated by a distance 54 which permits cam follower 49 to continuously be in contact with both cam surfaces 50 and 51, the cam follower 49 will follow a curve defined by cam surfaces 50 and 51, and if this curve is sinusoidal as shown in FIG. 5, pistons 45' will in turn be reciprocated in a sinusoidal manner. When this situation occurs, the pistons will be pumping at maximum stoke and thereby providing maximum torque load on the windmill rotor.

It will be apparent that distance 54 should be initially set greater than the diameter of cam follower 49 such that initially less than the maximum volume of water will be pumped. This will permit the load on the windmill to be increased or decreased, as required, to regulate the rotor velocity. As the wind velocity varies, thus requiring the speed of the windmill rotor to be increased or decreased to maintain the predetermined maximum power speed ratio, idler arm 34 will be rotated accordingly to move lower plate 53 and consequently to change distance 54. This change in distance will vary the load applied to the windmill shaft by altering the length of the piston stroke.

It should be noted that the number of lobes 55 on cam surfaces 50 and 51 should be odd while the number of pistons arranged circumferentially around housing 28 should be even in order to better distribute the load about axis 14.

Figure 6:
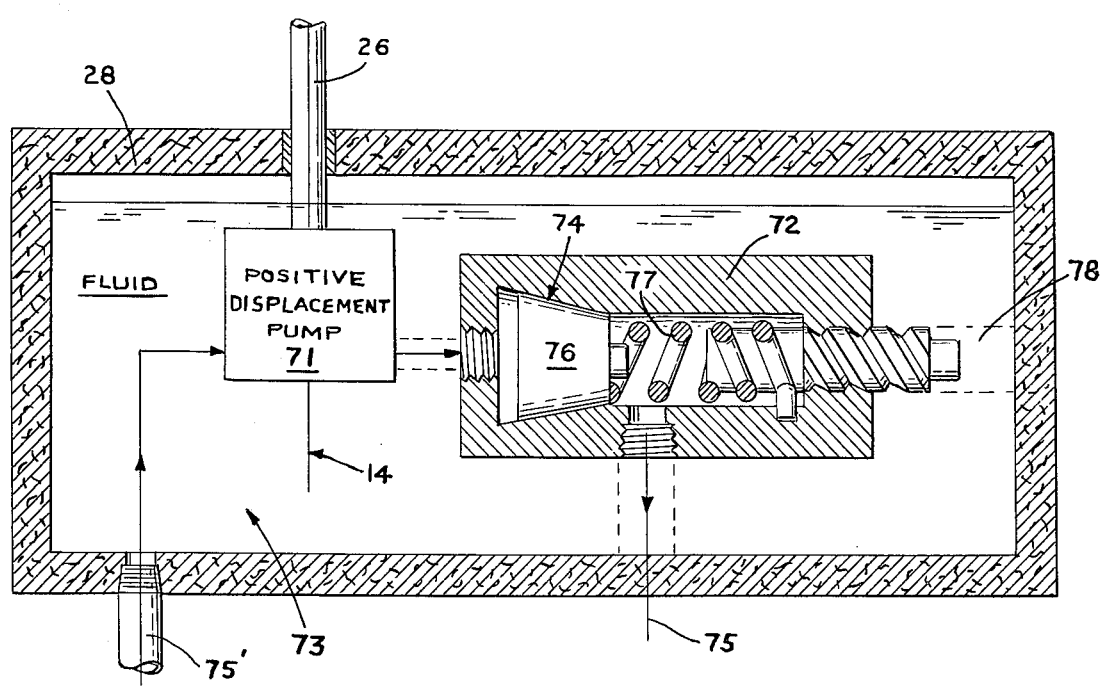
FIG. 6 is a schematic view of yet another alternative embodiment of the invention.

The functions of energy conversion and load feedback inherent in the instant invention may be accomplished by yet another alternative embodiment, as depicted in FIG. 6. As shown in this schematic view, a constant positive displacement pump 71 is utilized in conjunction with a displacement-pressure coordinating valve 72. Furthermore, this combination may also be utilized to regulate the windmill's speed in place of the gear speed governor 13 described above, thus obviating the necessity for an auxiliary wind sensor such as an anemometer.

In FIG. 6, a positive displacement pump 71 and a displacement-pressure coordinating valve 72 are placed in an insulated housing 28 filled with some suitable heat-absorbing fluid 73. In this embodiment, heat is generated by fluid friction or shear heating in valve seat 74. This generated heat is absorbed by fluid 73 and is retained within insulated housing 28. External circulating means (not shown) may be utilized to circulate the heated fluid via an outlet pipe 75 and an inlet pipe 75' to any desired location external to housing 28. The amount of heat generated is a function of the pump pressure and the flow of fluid across valve 72 and is quantified by equations well-known to those skilled in the art. Valve 72 includes a tapered valve seat 74 of predetermined length and a valve plug 76 which is biased by a spring 77. As fluid pressure is applied to the larger end of the valve plug, the space between the plug and the seat functions as a capillary annular orifice which causes a pressure drop in the fluid which is proportional to the flow rate. As the rotational speed of the windmill varies, pump 71 will deliver a variable flow to the valve. This, in turn, changes the pressure existing at the large end of the valve plug. Since the down-stream end of the plug is exposed to a constant and low pressure, the valve plug will move within the valve seat in a manner controlled by this pressure and the stiffness of the valve spring 77. By suitable calibration, valve 72 will provide predetermined back pressure to pump 71 which in turn will exert a predetermined load on the windmill rotor in order to maintain its speed at a predetermined value.

Calibration of valve 72 may be facilitated by use of a core screw 78 which varies the length of the free spring coils at the end of the screw. Additionally, variations of the valve configuration, such as contoured seats, may be utilized to give accurate control in the presence of variations in fluid viscosity due to temperature changes or use of non-Newtonian fluids.

It will be understood by those skilled in the art that various improvements and modifications may be made on the embodiment of the invention disclosed herein without departing from the spirit and scope thereof.

What is claimed is:

1. Apparatus for converting rotational kinetic energy into a different energy form, said rotational kinetic energy being obtained from the rotor shaft of a rotatable energy conversion device that itself converts the kinetic energy of a moving stream of fluid into said rotational kinetic energy, said fluid kinetic energy conversion having a maximum efficiency at a predetermined rotor shaft speed, said rotatable energy conversion device including means for measuring the velocity of the stream of fluid and for translating the same to the rotation of a second shaft, said apparatus comprising:
    (a) at least one rotatable friction disc connected to said rotor shaft for rotation therewith;
    (b) at least one stationary friction disc mounted on a support means;
    (c) said rotatable and said stationary discs being relatively displaceable between positions of high and low frictional engagement with each other; and
    (d) means responsive to variations in the relative angular velocities of said rotor shaft and said second shaft to vary the position of said rotatable and stationary discs whereby to vary the frictional engagement therebetween.

2. Apparatus according to claim 1 including means for coupling heat energy generated by the frictional engagement of said rotatable and stationary discs to an external utilization device.

3. Apparatus according to claim 1 wherein said means responsive to variations in the relative angular velocities of said rotor shaft and said second shaft includes a planetary gear means.

4. Apparatus according to claim 3 wherein said planetary gear means includes a circular gear rotatably mounted on a threaded stud whereby rotation of said circular gear causes displacement of said circular gear axially of said threaded stud, said displacement of said circular gear for varying the relative positions of said rotatable and stationary discs to vary the frictional engagement therebetween.

5. Apparatus according to claim 3 wherein said rotor shaft and said second shaft are co-axial.

6. Apparatus according to claim 4 wherein said rotor shaft, said second shaft and said threaded stud are co-axial.

* * * * *